Patented Jan. 2, 1940

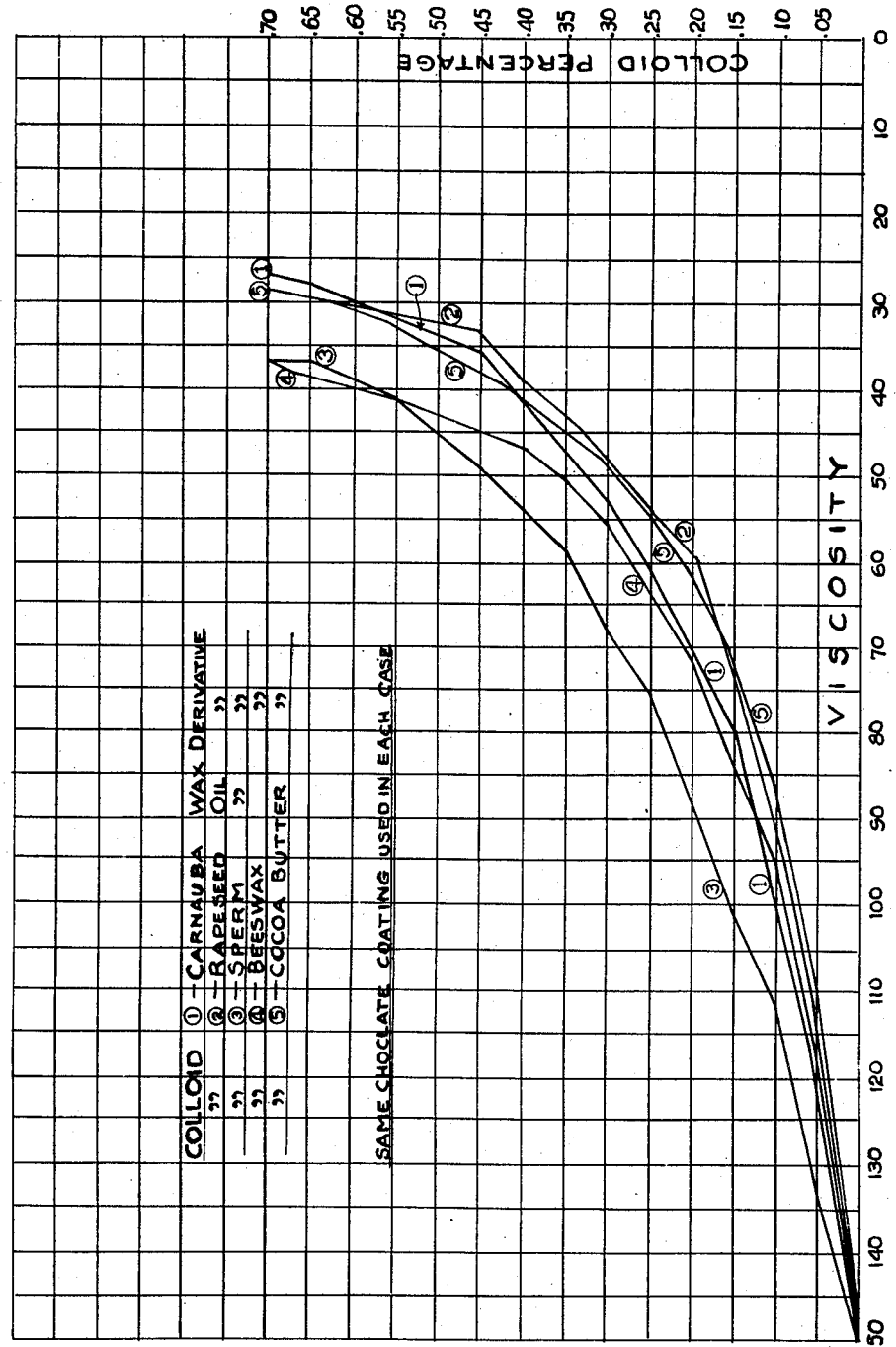

2,185,592

UNITED STATES PATENT OFFICE 2,185,592

PROCESS OF MAKING A VISCOSITY LOW-
ERING CONDENSATION PRODUCT FROM
HIGHER FATTY ACIDS AND ESTERS
THEREOF

Stroud Jordan, Brooklyn, N. Y.

Application August 29, 1934, Serial No. 741,936
Renewed November 2, 1938

13 Claims. (Cl. 260—398)

This invention relates to a product for wetting pulverulent solid materials, or to a viscosity-lowering product and the process of making the product.

More particularly the invention relates to a product for modifying the viscosity or surface tension of the continuous phase of a liquid to facilitate the complete wetting or suspension of small granular particles in the liquid.

The product of the present invention has the remarkable ability of modifying the physical properties of a liquid such as fat or oil to change the viscosity and surface tension, the nature of the modifying action not being fully understood. The product is colloidally soluble in most fats and oils and appears to have a strong electrical ionization or charge such that a comparatively small amount of product will instantly act to reduce to its minimum viscosity a mixture of fat and insoluble granular particles.

To store this concentrated energy the product has a complex molecular structure which is built up by the condensation and/or polymerization of complex molecular material such as animal and vegetable oils, fats and waxes. The condensation is carried on by means of heat regulation and a condensing and/or catalyzing agent which to a limited degree enters into the molecular structure of the product. Preferably the condensation is carried to the point where a degradation or formation of free carbon starts and the crude product containing the most energy or active properties is dark colored or black. The condensation agent is preferably an anhydrous product such as phosphorus pentoxide or aluminum chlorid so that during the condensing action any water formed is absorbed by the condensing agent and the product is dehydrated.

The desired product may be made directly from natural fats, oils or waxes of vegetable or animal origin or insect waxes by condensation with $P_2O_5$. The condensation may be carried out either with or without the presence of a solvent such as benzol. In place of using the natural fats, oils, waxes or glycerides it is often better to saponify the fats, waxes, oils or glycerides to separate therefrom fatty acids and then condense the fatty acids with $P_2O_5$ with or without the presence of a solvent such as benzol. The natural oil, fat, wax or glycerid is preferably saponified with alcoholic potash to form soap, the soap then being separated and treated with a mineral acid such as hydrochloric to neutralize the soap and washed with water, the fatty acids then being dried. Such a fatty acid product is then ready to be condensed with $P_2O_5$.

With some natural fats, oils or waxes or their corresponding fatty acids, such as lanolin, palmitic acid, sperm oil and its fatty acids, cotton seed oil and its fatty acids, the use of from 1 to 5% by weight of $P_2O_5$ to the weight of the oil, fatty acid or wax, gives satisfactory results for carrying on the condensation. With other oils, fats or waxes, such as beeswax and its fatty acids, carnauba wax and its fatty acids, palm oil, stearic acid, oleic acid, cocoa butter, rape seed oil and its fatty acids, soya bean oil and its fatty acids, whale oil and its fatty acids, coconut oil and its fatty acids, and corn oil require a percentage by weight of $P_2O_5$ of from 10 to 100% of the weight of the oil, fat or wax being condensed to obtain the proper condensation. When such a large percentage of $P_2O_5$ is used in the condensation it is preferably best to add the $P_2O_5$ in successive stages to gradually build up the total amount in effecting the best condensation. When successive small proportions are used while agitating the mixture and using heat the condensation reaction may be completed in a comparatively short time.

The condensation and phosphorizing of the product may be facilitated by heat and agitation and by this means a minimum amount of $P_2O_5$ may be used in carrying on the condensation. When using 5% or less of $P_2O_5$ to the weight of the oil, fat or wax being condensed it has been found that the condensation preferably should extend over a period of three to four hours with agitation and heat in order to become complete. It will be seen therefore that the condensation depends upon the amount of $P_2O_5$ used, the time for the condensation reaction, the temperature of the reaction products, the thoroughness of the agitation of the reaction mixture and the type of oil, fat or wax being condensed.

The condensation of the oil, fat and wax may be carried on with aluminum chlorid in place of the $P_2O_5$. The proportion of aluminum chlorid to the oil, fat or wax being treated will vary as widely as that of the proportions of $P_2O_5$ above described. The aluminum chlorid is very effective as a dehydrating agent acting during the condensation operation, but aluminum chlorid does not seem to react chemically with the oil, fat or wax to the extent that $P_2O_5$ enters into the molecular structure of the condensation product.

When a substantial amount of the anhydrous $P_2O_5$ or $AlCl_3$ is used in condensing some oils, fats or waxes, it has been found that the anhydrous agent acts to form the acids of the oils, fats or waxes, before the condensation takes place, so that the condensation action is a condensation of the acids. The P₂O₅ and aluminum chloride catalysts act as dehydration catalysts to dehydrate the fatty material and separate glycerine.

After the condensation of the fatty material has been completed it is preferably purified by one or more treatments or extractions with acetone. The acetone treatment may be either hot or cold. After the acetone-soluble material has been extracted the residue is dissolved in a suitable solvent such as benzol and settled with or without the use of material such as carbon or calcium carbonate and the resulting material is ready for treating oil and solid material mixtures to modify their viscosity. Preferably the purified material is dissolved in the fat or oil which is a continuous phase of the mixture being treated in order that the viscosity lowering effect may be immediately transmitted to all parts of the mixture. In place of acetone it has been found with some forms of material that the extraction may be made with ethyl alcohol ($C_2H_5OH$), ethyl ether and water or these compounds may be used in conjunction with acetone for extracting soluble material. It is the acetone-insoluble extract that usually has the greatest effect in modifying the viscosity characteristics of an oil-insoluble granular material mixture.

The following are typical examples of the condensation of fats, fatty acids, oils and waxes.

*Example 1.*—100 grams of anhydrous lanolin was dissolved in 100 cc. of benzol and treated with 10 grams of P₂O₅ and heated two hours on a steam bath and left standing over night. This material was then filtered with the aid of carbon and calcium carbonate and the material in the filtrate when separated from the solvent was very effective in modifying the viscosity of a chocolate coating consisting of chocolate, added cocoa butter and sugar. The material which has been filtered may be extracted several times with cold acetone and the acetone-insoluble material is then suitable for treating a chocolate mixture to modify its viscosity.

*Example 2.*—50 grams of cerotic acid from carnauba wax are treated with 50 grams of P₂O₅ and left on the steam bath one and one-half hours being constantly stirred. The hard mass was extracted with ether, centrifuged to separate soluble material and ether evaporated. The solid material remaining is very effective in modifying the viscosity of a chocolate mixture.

*Example 3.*—150 grams of palm oil dissolved in 100 cc. of benzene and treated with 15 grams of P₂O₅. This mixture is heated on the steam bath from three to five hours. The heavy black layer separated from uncondensed material was extracted with acetone and the acetone-insoluble portion was found to be effective in modifying the viscosity of the ordinary sugar-chocolate coating material.

*Example 4.*—150 grams of beeswax was treated with 139 grams of P₂O₅ and digested on a steam bath for several hours. The soluble material was then extracted with acetone and the acetone-insoluble portion was found to be very effective in modifying the viscosity of a chocolate coating mixture. It was also found that by using ether as well as acetone for extracting the insoluble material that a product having greater effect on the viscosity of a chocolate mixture would result after the ether-soluble material.

*Example 5.*—100 grams of beeswax and 100 grams of cocoa butter were treated with 20 grams of P₂O₅ and digested on a steam bath with mixing for eight hours. The condensed material was then washed three times with acetone to extract the acetone-soluble material, the acetone-insoluble portion was then found to be very effective in lowering the viscosity of chocolate coating mixtures.

The condensation products made in accordance with the present invention are all oil and fat soluble colloids which are insoluble in water. The products all tend to emulsify with water and are mostly insoluble in acetone, although some products soluble in acetone have been effective in modifying the viscosity of oil-granular material mixtures. It has been found that the crude condensation products are acid in character, very viscous, of a black lustrous appearance, odorless and tasteless. The property of reducing the viscosity of oil-pulverulent granular mixtures is the most striking property of these products. The products tend to modify the surface tension of oil and fat solutions. Most of the condensation products are soluble in ethyl ether and petroleum ether.

A condensation product semiliquid or waxy in character as made from lanolin, for example, is an ideal viscosity controller for chocolate coatings because it will remain in solution in the chocolate at normal temperatures and thus be effective for maintaining the minimum viscosity of a mixture of chocolate and sugar at normal temperatures.

The condensation products made from most oils, fats and waxes are suitable products for modifying the viscosity of food products because they do not have any deleterious effect as foods.

A large variety of condensation products have been made from different oils, fats, fatty acids and waxes of vegetable and animal origin and it is found that practically all of these condensation products are capable of producing a practical, minimum viscosity in a liquid mixture of oil or fats with an insoluble granular material, such as cocoa butter and sugar, linseed oil and pigments. Effective viscosity-lowering condensation products have been produced from the following materials: Lanolin, beeswax, cerotic acid, palm oil, palmitic acid, sperm oil, linoleic acid, oleic acid, stearic acid, cocoa butter, linseed oil, peanut oil, rapeseed oil, soya bean oil, whale oil, spermaceti, cottonseed oil, coconut oil, corn oil.

Extensive research work has shown that if the condensation product is properly prepared the product will substantially instantaneously impart to a mixture of oil or fat with granular material a minimum viscosity. The minimum viscosity of an oil-granular material mixture is usually determined in accordance with the standard method of using the MacMichael viscosimeter. This minimum viscosity of a mixture may be determined by the following formula:

$$V = \frac{Av^1 + Bv^2 + Cv^3}{A+B+C} f$$

This formula applies to a mixture such as a chocolate coating used in candy manufacture and would consist, for example, of

| | Per cent |
|---|---|
| Bitter chocolate | 40 |
| Cocoa butter | 15 |
| Powdered sugar | 45 |

The minimum viscosity is always reckoned at 100° F. In applying the above formula to the chocolate coating mixture A would equal the percentage of bitter chocolate in the mixture, B the percentage of added cocoa butter in the mixture, and C is the percentage of colloid or condensation product in the mixture. $v^1$ is the viscosity of the bitter chocolate, $v^2$ is the viscosity of the cocoa butter and $v^3$ is the viscosity of the condensation product. $f$ is the internal friction factor and V is the minimum viscosity of the mixture.

The amount of condensation product may be less than .5 of 1% of the mixture and the viscosity of the condensation product is usually very small. The friction factor is not large provided there is sufficient cocoa butter to coat all of the particles of sugar. Accordingly the factors C, $v^3$ and $f$ can be eliminated from the formula because they have relatively small importance. Therefore in applying the above formula to a chocolate coating mixture such as discussed above wherein the viscosity $v^1$ of the bitter chocolate at 100° F. is 45 and the viscosity $v^2$ of cocoa butter at 100° F. is 1, then the minimum viscosity $$V = \frac{(40 \times 45) + (15 \times 1)}{40 + 15} = 33$$

The minimum viscosities of different mixtures of the same materials will vary considerably in accordance with the proportions of each of the materials in the mixture and in accordance with the fineness of the pulverulent material. The viscosity will be indeterminate if there is not sufficient fat or oil in the mixture to completely float or wet all the solid particles of the pulverulent material. Furthermore with some mixtures the factor $f$ may become an appreciable factor if present in substantial amount.

Experimental work seems to indicate that when treating the same mixture of oil and fat with the same solid pulverulent material that substantially the same amount by weight of the condensation product, regardless of the source of the condensation product, will be capable of providing the minimum viscosity of the mixture. This is illustrated in the accompanying drawing which shows curves of the relationship of viscosity of the chocolate coating material of a mixture of chocolate, added cocoa butter and powdered sugar where different condensation products are used to vary the viscosity of the mixture. We see from these curves that the practical economic viscosity of each of the mixtures is reached when approximately .55% of the condensate or colloid product is used for controlling the viscosity of the chocolate mixture. In the chart the abscissi are the viscosities of the mixture and the ordinates are the percentage by weight of the colloid product to the weight of the chocolate coating mixture.

A colloid condensation product made in accordance with the present invention has considerable application in industry. It may be used for wetting fine particles of an oily medium in a mixture of oil and solid materials. It may be used in making chocolate coatings or mixtures of cocoa butter, chocolate and sugar. It may be used in making mixtures of sugar in butter, milk and cream. When using the colloid in these mixtures of oils or fats with solid particles the maximum amount of solid part or solid particles may be combined with a minimum amount of oily or fatty material. It may be used to retard graying in chocolate coatings. It may be used as a viscosity modifying agent for wetting the surface of hides and leather and for oiling the surface of threads and yarn in knitting, weaving and spinning.

Due to the property of the condensation product to reduce mixtures of oils or fats with solid pulverulent material to its minimum viscosity the product is efficient for plasticizing mixtures for molding. With many mixtures such as chocolate coatings the condensation product has the property of causing the mixture to contract when cooling and solidifying. This is very important in that it facilitates the removal of the mixtures from molds and reduces to a minimum the loss when molding.

Having thus described the invention, what is claimed as new is:

1. A process of making a fat soluble condensation product comprising reacting a material of the class consisting of fatty carboxylic acids of animal and vegetable oils, fats and waxes or a mixture of two or more such acids, with phosphorus pentoxide ($P_2O_5$) under a controlled heating starting at a temperature of boiling water to the point of degradation of the materials, the proportion of $P_2O_5$ being such that the reaction is a condensation to enlarge the molecular structure without the formation of phosphoric acid esters.

2. A process of making a fat soluble condensation product comprising reacting a material of the class consisting of fatty carboxylic acids of animal and vegetable oils, fats and waxes, with at least 5% by weight of phosphorus pentoxide ($P_2O_5$) to the weight of the material being condensed and adding the phosphorus pentoxide ($P_2O_5$) in successive increments to the condensation reaction mixture while carrying on the reaction starting at a temperature of boiling water, to promote a condensation reaction to enlarge the molecular structure to a point where carbon is set free without forming phosphoric acid esters.

3. A process of making a fat soluble condensation product comprising reacting a material of the class consisting of animal and vegetable oils and fats, with $P_2O_5$ as a dehydration agent to split off glycerol and form fatty acids, and continuing the condensation of the fatty acids with $P_2O_5$ as a condensing agent until the condensation reaction to produce an enlarged molecular structure has advanced to the point where carbon is set free.

4. A process of making a water insoluble colloid comprising reacting cocoa butter with $P_2O_5$ as a dehydration agent under a controlled heating starting at boiling water temperature, carrying on a condensation reaction with sufficient $P_2O_5$ to condense the cocoa butter without the formation of phosphoric acid esters and separating acetone soluble material from the condensation product.

5. A process of making a fat soluble colloid comprising reacting beeswax with $P_2O_5$ as a condensing agent under a controlled heating at boiling water temperature, carrying on the condensation reaction to the point of carbon formation and separating acetone-soluble material from the condensation product.

6. A fat soluble colloid comprising a water insoluble condensation product obtained by the condensation of raw materials comprising fatty acids of the class consisting of animal and vegetable oils, fats and waxes, with a phosphorus pentoxide catalyst to condense the fatty acid material to the point of formation of carbon and to introduce a substantial amount of phosphorus into the molecular structure of the colloid without the formation of phosphoric acid esters, the acetone soluble portion of the condensate of the raw material being then removed.

7. A fat soluble colloid comprising a condensation product of the wax acids of beeswax with a $P_2O_5$ dehydration catalyst to the point where degradation starts or carbon is set free, said colloid being substantially free of phosphoric acid esters.

8. A fat soluble colloid comprising the condensation product of enlarged molecular structure of cocoa butter fatty acids with the $P_2O_5$ dehydration catalyst to the point where degradation starts or carbon is set free, said colloid being substantially free of phosphoric acid esters.

9. A water insoluble colloid formed by the condensation of raw material of the class consisting of fatty acids of animal and vegetable oils, fats and waxes, with $P_2O_5$, said condensation product having phosphorus in its molecular structure and being substantially free of phosphoric acid esters of glycerides and having the acetone soluble material extracted therefrom.

10. A condensation product of complex molecular structure resulting from the condensation to the point where degradation starts with the elimination of water of materials of the class consisting of fatty acids of animal and vegetable oils, fats and waxes with $P_2O_5$, said condensation product being substantially free of phosphoric acid esters and having a black, lustrous appearance, odorless and tasteless, water-insoluble and giving an acid reaction.

11. A fatty oil soluble colloid derived from a condensation of raw material of the class consisting of fatty acids of animal and vegetable oils, fats and waxes by condensation with phosphorus pentoxide under controlled heating starting at a temperature of boiling water under conditions to enlarge the molecular structure of the fatty acid with the elimination of water while placing a substantial amount of phosphorus in the molecular structure without the formation of phosphoric acid esters, the condensation being carried on to the point of precipitation formation of carbon in the colloid, the colloid being water-insoluble, of black, lustrous appearance, and capable of substantially instantly reducing the viscosity of a mixture of liquid fat and solid granular material to the practical minimum viscosity of said mixture.

12. A process of making a fat soluble condensation product comprising reacting a material of the class consisting of fatty carboxylic acids of animal and vegetable oils, fats and waxes dissolved in a solvent with less than ten percent by weight of phosphorus pentoxide ($P_2O_5$), the temperature of the reaction being controlled to provide a condensation reaction of the acids without the formation of phosphoric acid esters and continuing the condensation reaction to the point of degradation of the material.

13. A process of making a fat soluble condensation product comprising reacting a material of the class consisting of fatty carboxylic acids of animal and vegetable oils, fats and waxes dissolved in benzol with less than 10% by weight of phosphorus pentoxide ($P_2O_5$), the temperature of the reaction being controlled to provide a condensation reaction of the acids without the formation of phosphoric acid esters and continuing the condensation reaction to the point of carbon formation.

STROUD JORDAN.